US010594712B2

United States Patent
Mestha et al.

(10) Patent No.: US 10,594,712 B2
(45) Date of Patent: Mar. 17, 2020

(54) SYSTEMS AND METHODS FOR CYBER-ATTACK DETECTION AT SAMPLE SPEED

(71) Applicant: General Electric Company, Schenectady, NY (US)

(72) Inventors: Lalit Keshav Mestha, North Colonie, NY (US); Justin Varkey John, Niskayuna, NY (US); Weizhong Yan, Clifton Park, NY (US); David Joseph Hartman, Staten Island, NY (US)

(73) Assignee: General Electric Company, Schenectady, NY (US)

( * ) Notice: Subject to any disclaimer, the term of this patent is extended or adjusted under 35 U.S.C. 154(b) by 1 day.

(21) Appl. No.: 15/484,282

(22) Filed: Apr. 11, 2017

(65) Prior Publication Data

US 2018/0159879 A1    Jun. 7, 2018

Related U.S. Application Data

(60) Provisional application No. 62/430,663, filed on Dec. 6, 2016.

(51) Int. Cl.
*G06F 21/00* (2013.01)
*H04L 29/06* (2006.01)
(Continued)

(52) U.S. Cl.
CPC ....... *H04L 63/1425* (2013.01); *G06N 3/0454* (2013.01); *G06N 3/084* (2013.01);
(Continued)

(58) Field of Classification Search
CPC ......... H04L 51/02; H04L 67/10; H04L 51/04; H04L 61/3025; H04L 63/0428
See application file for complete search history.

(56) References Cited

U.S. PATENT DOCUMENTS

2012/0233127 A1    9/2012   Solmer et al.
2015/0254555 A1    9/2015   Williams et al.
(Continued)

FOREIGN PATENT DOCUMENTS

| CN | 104123500 | * 10/2014 |
| CN | 104751140 A | 7/2015 |
| CN | 104792530 A | 7/2015 |

OTHER PUBLICATIONS

Renu Khandelwal, Deep Learning—Different Types of Autoencoders, Dec. 1, 2018, 1-13 (Year: 2018).*

(Continued)

*Primary Examiner* — Ghazal B Shehni
(74) *Attorney, Agent, or Firm* — Buckley, Maschoff & Talwalkar LLC

(57)    ABSTRACT

A threat detection model creation computer receives normal monitoring node values and abnormal monitoring node values. At least some received monitoring node values may be processed with a deep learning model to determine parameters of the deep learning model (e.g., a weight matrix and affine terms). The parameters of the deep learning model and received monitoring node values may then be used to compute feature vectors. The feature vectors may be spatial along a plurality of monitoring nodes. At least one decision boundary for a threat detection model may be automatically calculated based on the computed feature vectors, and the system may output the decision boundary separating a normal state from an abnormal state for that monitoring node. The decision boundary may also be obtained by combining feature vectors from multiple nodes. The decision boundary may then be used to detect normal and abnormal operation of an industrial asset.

25 Claims, 18 Drawing Sheets

(51) Int. Cl.
*G06N 20/00* (2019.01)
*G06N 20/10* (2019.01)
*G06N 3/04* (2006.01)
*G06N 3/08* (2006.01)
*G06N 7/00* (2006.01)

(52) U.S. Cl.
CPC ............ *G06N 20/00* (2019.01); *G06N 20/10* (2019.01); *G06N 7/005* (2013.01)

(56) References Cited

U.S. PATENT DOCUMENTS

2016/0048741 A1   2/2016   Nguyen et al.
2016/0307566 A1   10/2016  Bellegarda
2017/0279833 A1*  9/2017   Vasseur ............... H04L 63/1425

OTHER PUBLICATIONS

Niyaz, Quamar et al., "A Deep Learning Approach for Network Intrusion Detection System", The University of Toledo, http://www.eng.utoledo.edu/~qniyaz/bict_v2.pdf., 6pgs.

Hardy, William et al., "DL4MD: A Deep Learning Framework for Intelligent Malware Detection", International Conference on Data Mining, http://worldcomp-proceedings.com/proc/p2016/DMI8002.pdf, 2016, (pp. 61-67, 7 total pages).

Akintayo, Adedotun et al., "Early Detection of Combustion Instabilities using Deep Convolution Selective Auto encoders on Hi-speed Flame Video", Iowa State University, https://arxiv.org/pdf/1603.07839.pdf, Mar. 25, 2016, 10pgs.

Zolotukhin, Mikhail et al., "Increasing Web Service Availability by Detecting Application-Layer DDoS Attacks in Encrypted Traffic", 23rd International Conference on Telecommunications (ICT), May 16-18, 2016, 6pgs.

\* cited by examiner

US 10,594,712 B2

SYSTEMS AND METHODS FOR CYBER-ATTACK DETECTION AT SAMPLE SPEED

CROSS-REFERENCE TO RELATED APPLICATIONS

The present application claims the benefit of previously filed U.S. Provisional Patent Application No. 62/430,663 entitled "SYSTEMS AND METHODS FOR CYBER-ATTACK DETECTION AT SAMPLE SPEED" and filed on Dec. 6, 2016. The entire contents of that application are incorporated herein by reference.

BACKGROUND

Industrial asset control systems that operate physical systems (e.g., associated with power turbines, jet engines, locomotives, autonomous vehicles, etc.) are increasingly connected to the Internet. As a result, these control systems may be vulnerable to threats, such as cyber-attacks (e.g., associated with a computer virus, malicious software, etc.), that could disrupt electric power generation and distribution, damage engines, inflict vehicle malfunctions, etc. Current methods primarily consider threat detection in Information Technology ("IT," such as, computers that store, retrieve, transmit, manipulate data) and Operation Technology ("OT," such as direct monitoring devices and communication bus interfaces). Cyber-threats can still penetrate through these protection layers and reach the physical "domain" as seen in 2010 with the Stuxnet attack. Such attacks can diminish the performance of an industrial asset and may cause a total shut down or even catastrophic damage to a plant. Currently, Fault Detection Isolation and Accommodation ("FDIA") approaches only analyze sensor data, but a threat might occur even in other types of threat monitoring nodes such as actuators, control logical(s), etc. Also note that FDIA is limited only to naturally occurring faults in one sensor at a time. FDIA systems do not address multiple simultaneously occurring faults as they are normally due to malicious intent. Note that quickly detecting an attack may be important when responding to threats in an industrial asset (e.g., to reduce damage, to prevent the attack from spreading to other assets, etc.). Making such a detection quickly (e.g., at substantially sample speed), however, can be a difficult task. It would therefore be desirable to protect an industrial asset from malicious intent, such as cyber-attacks, in an automatic, rapid, and accurate manner.

SUMMARY

According to some embodiments, a threat detection model creation computer may receive a series of normal monitoring node values and a series of abnormal monitoring node values. At least some received monitoring node values may be processed with a deep learning model to determine parameters of the deep learning model (e.g., a weight matrix and affine terms). The parameters of the deep learning model and received monitoring node values may then be used to compute feature vectors of monitoring node values. The feature vectors may be spatial along a plurality of monitoring nodes. At least one decision boundary for a threat detection model may be automatically calculated based on the computed feature vectors, and the system may output the decision boundary separating a normal state from an abnormal state for that monitoring node. The decision boundary may also be obtained by combing feature vectors from multiple nodes. The decision boundary may then be used to detect normal and abnormal operation of an industrial asset.

Some embodiments comprise: means for receiving, at a threat detection model creation computer, a series of normal monitoring node values from a normal space data source storing, for each of a plurality of monitoring nodes, the series of normal monitoring node values over time that represent normal operation of the industrial asset; means for receiving, at the threat detection model creation computer, a series of abnormal monitoring node values from an abnormal space data source storing, for each of the plurality of monitoring nodes, a series of abnormal monitoring node values over time that represent abnormal operation of the industrial asset; means for processing at least some received monitoring node values with a deep learning model to determine parameters of the deep learning model; means for using the parameters of the deep learning model and received monitoring node values to compute feature vectors of monitoring node values; and means for automatically calculating and outputting at least one decision boundary for a threat detection model based on the computed feature vectors, the decision boundary separating a normal state from an abnormal state for that monitoring node.

Some technical advantages of some embodiments disclosed herein are improved systems and methods to protect an industrial asset from malicious intent such as cyber threats in an automatic, rapid, and accurate manner.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
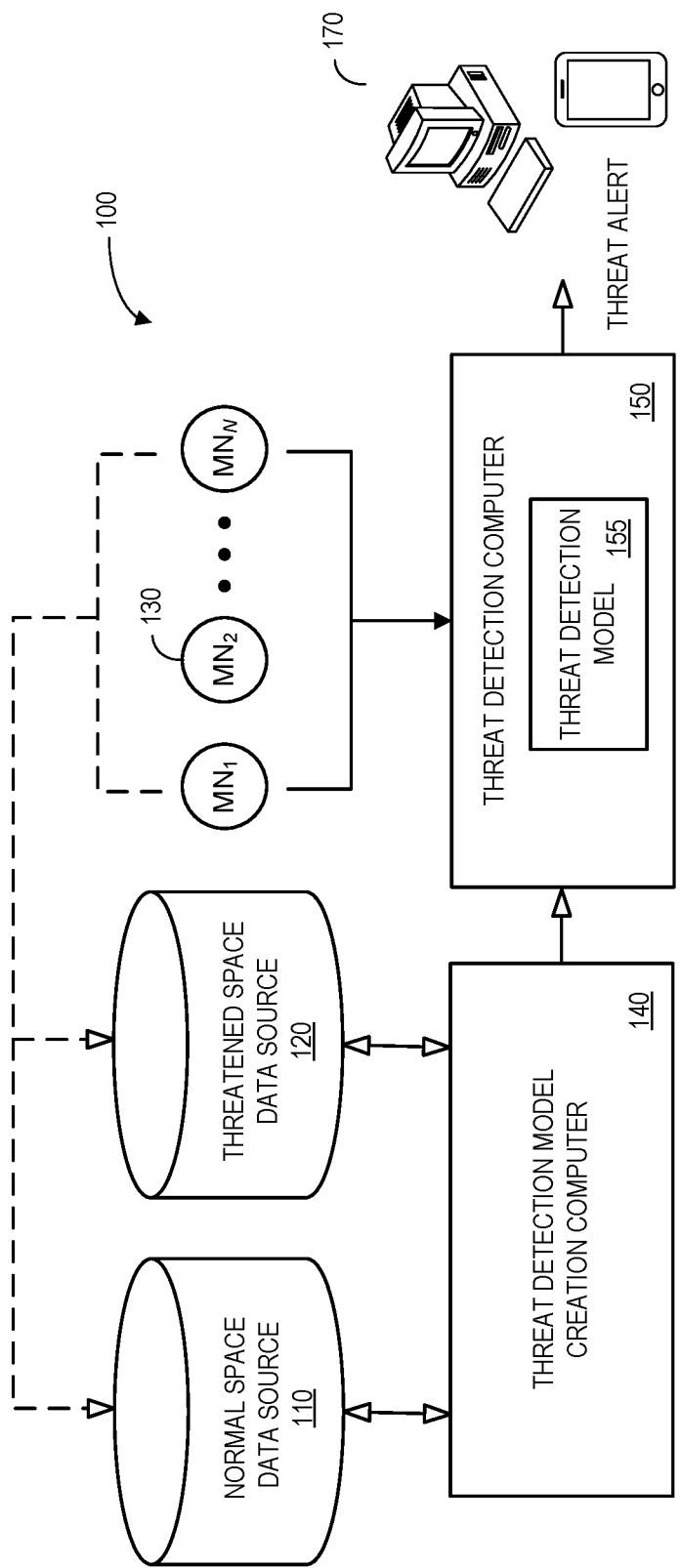
FIG. 1 is a high-level block diagram of a system that may be provided in accordance with some embodiments.

Industrial control systems that operate physical systems are increasingly connected to the Internet. As a result, these control systems may be vulnerable to threats and, in some cases, multiple attacks may occur simultaneously. Existing approaches to protect an industrial asset, such as FDIA approaches, may not adequately address these threats—especially when multiple, simultaneous attacks occur. It would therefore be desirable to protect an industrial asset from cyber threats in an automatic, rapid, and accurate manner. FIG. 1 is a high-level architecture of a system 100 in accordance with some embodiments. The system 100 may include a "normal space" data source 110 and an abnormal or "threatened space" data source 120. The normal space data source 110 might store, for each of a plurality of "monitoring nodes" 130 (shown in FIG. 1 as "$MN_1$," "$MN_2$,", ..., "$MN_N$" for "1, 2, . . . , N" different monitoring nodes), a series of normal values over time that represent normal operation of an industrial asset (e.g., generated by a model or collected from actual monitoring node 130 data as illustrated by the dashed line in FIG. 1). As used herein, the phrase "monitoring node" might refer to, for example, sensor data, signals sent to actuators, motors, pumps, and auxiliary equipment, intermediary parameters that are not direct sensor signals not the signals sent to auxiliary equipment, and/or control logical(s). These may represent, for example, threat monitoring nodes that receive data from the threat monitoring system in a continuous fashion in the form of continuous signals or streams of data or combinations thereof. Moreover, the nodes may be used to monitor occurrences of cyber-threats or abnormal events. This data path may be designated specifically with encryptions or other protection mechanisms so that the information may be secured and cannot be tampered with via cyber-attacks. The threatened space data source 120 might store, for each of the monitoring nodes 130, a series of threatened values that represent a threatened operation of the industrial asset (e.g., when the system is experiencing a cyber-attack).

Information from the normal space data source 110 and the threatened space data source 120 may be provided to a threat detection model creation computer 140 that uses this data to create a decision boundary (that is, a boundary that separates normal behavior from threatened behavior). The decision boundary may then be used by a threat detection computer 150 executing a threat detection model 155. The threat detection model 155 may, for example, monitor streams of data from the monitoring nodes 130 comprising data from sensor nodes, actuator nodes, and/or any other critical monitoring nodes (e.g., monitoring nodes $MN_1$ through $MN_N$), calculate at least one "feature" for each monitoring node based on the received data, and "automatically" output a threat alert signal to one or more remote monitoring devices 150 when appropriate (e.g., for display to a user). According to some embodiments, a threat alert signal might be transmitted to a monitoring device 170, a unit controller, a plant Human-Machine Interface ("HMI"), or to a customer via a number of different transmission methods. Note that one receiver of a threat alert signal might be a cloud database that correlates multiple attacks on a wide range of plant assets. As used herein, the term "feature" may refer to, for example, mathematical characterizations of data. Examples of features as applied to data might include the maximum, minimum, mean, standard deviation, variance, range, current value, settling time, Fast Fourier Transform ("FFT") spectral components, linear and non-linear principal components, independent components, sparse coding features, deep learning features, etc. Moreover, term "automatically" may refer to, for example, actions that can be performed with little or no human intervention. According to some embodiments, information about a detected threat may be transmitted back to the industrial asset.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The threat detection model creation computer 140 may store information into and/or retrieve information from various data sources, such as the normal space data source 110 and/or the threatened space data source 120. The various data sources may be locally stored or reside remote from the threat detection model creation computer 140 (which might be associated with, for example, offline or online learning). Although a single threat detection model creation computer 140 is shown in FIG. 1, any number of such devices may be included. Moreover, various devices described herein might be combined according to embodiments of the present invention. For example, in some embodiments, the threat detection model creation computer 140 and one or more data sources 110, 120 might comprise a single apparatus. The threat detection model creation computer 140 functions may be performed by a constellation of networked apparatuses, in a distributed processing or cloud-based architecture.

A user may access the system 100 via one of the monitoring devices 170 (e.g., a Personal Computer ("PC"), tablet, smartphone, or remotely through a remote gateway connection) to view information about and/or manage threat information in accordance with any of the embodiments described herein. In some cases, an interactive graphical display interface may let a user define and/or adjust certain parameters (e.g., threat detection trigger levels) and/or provide or receive automatically generated recommendations or results from the threat detection model creation computer 140 and/or threat detection computer 150.

Figure 2:
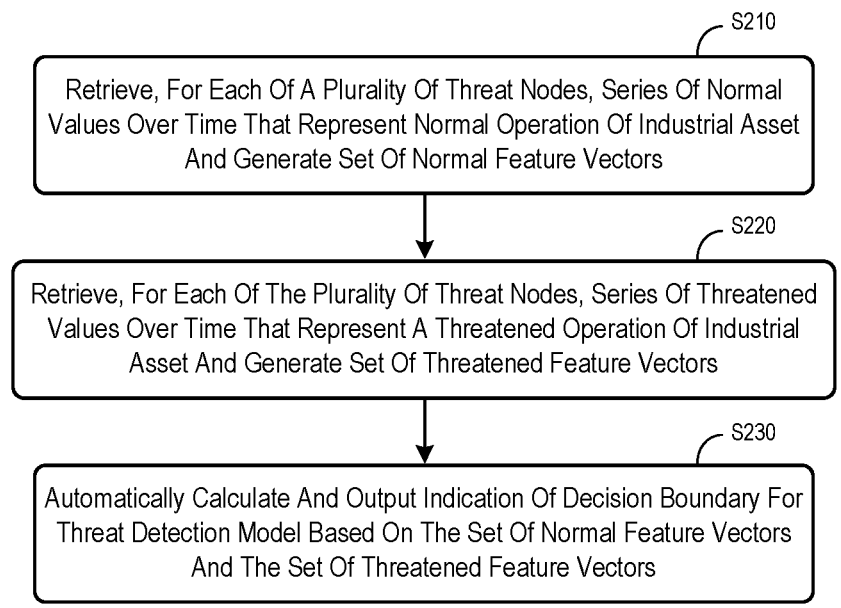
FIG. 2 is a model creation method according to some embodiments.

For example, FIG. 2 illustrates a model creation method that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, the system may retrieve, for each of a plurality of threat nodes, a series of normal values over time that represent normal operation of the industrial asset and a set of normal feature vectors may be generated. Similarly, at S220 the system may retrieve, for each of the plurality of threat nodes, a series of abnormal or threatened values over time that represent a threatened operation of the industrial asset and a set of threatened feature vectors may be generated. The series of normal and/or threatened values might be obtained using any of the embodiments described herein (e.g., associated with FIGS. 14A and 14B) for an industrial associated with a power turbine, a jet engine, a locomotive, an autonomous vehicle, etc. At S230, a decision boundary may be automatically calculated and output for a threat detection model based on the set of normal feature vectors and the set of threatened feature vectors. According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, threatened space, degraded operation space, faulty space, etc. In addition, note that the threat detection model might be associated with the decision boundary, feature mapping functions, and/or feature parameters.

Figure 3:
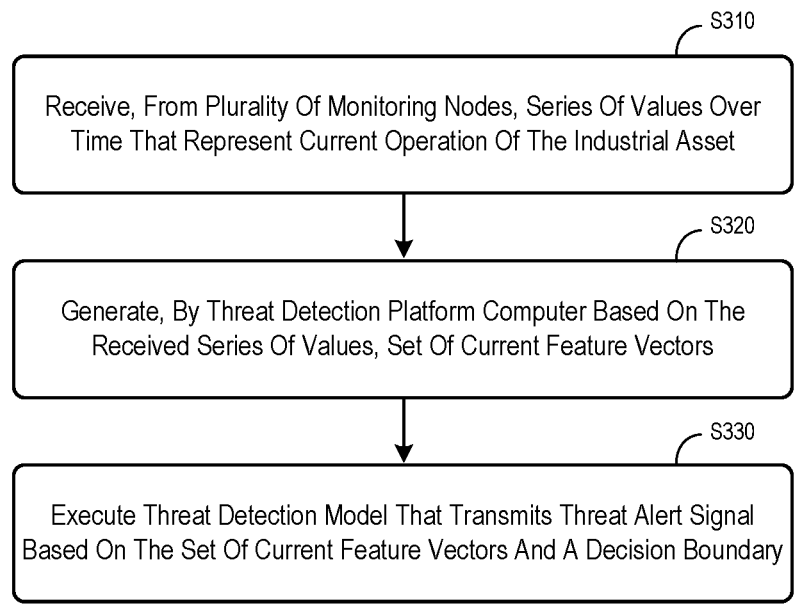
FIG. 3 is threat alert method according to some embodiments.

The decision boundary can then be used to detect cyber-attacks. For example, FIG. 3 is threat alert method according to some embodiments. At S310, the system may receive, from a plurality of monitoring nodes, a series of current values over time that represent a current operation of the industrial asset. At S320, a threat detection computer may then generate, based on the received series of current values, a set of current feature vectors. At S330, a threat detection model may be executed to transmit a threat alert signal based on the set of current feature vectors and a decision boundary when appropriate (e.g., when a cyber-attack is detected). According to some embodiments, one or more response actions may be performed when a threat alert signal is transmitted. For example, the system might automatically shut down all or a portion of the industrial asset (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high fidelity equipment models and/or actual "on the job" data to detect single or multiple simultaneous adversarial threats to the system. Moreover, according to some embodiments, monitoring node data may be converted to features using advanced feature-based methods, and the real-time operation of the control system may be monitoring in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 4:
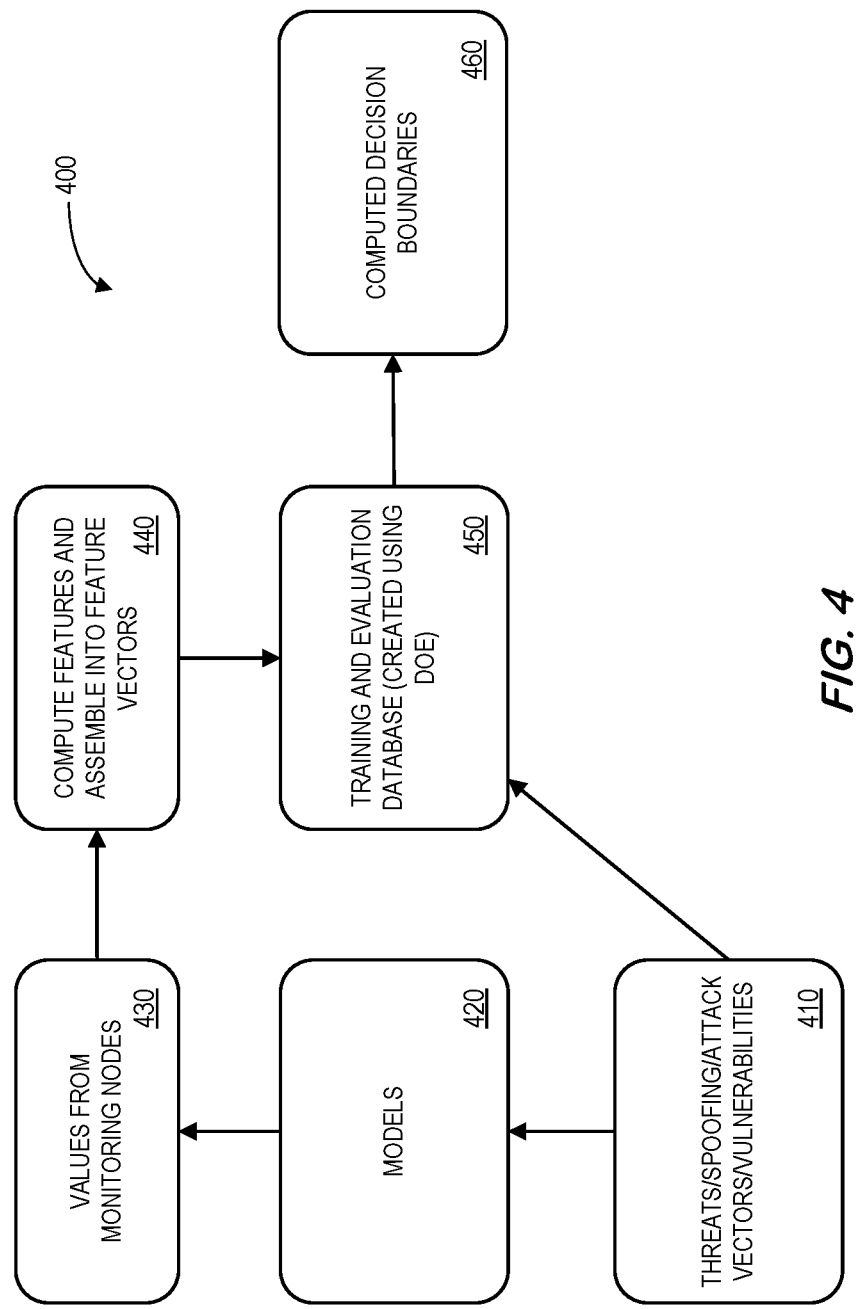
FIG. 4 illustrates an off-line process in accordance with some embodiments.

FIG. 4 illustrates an off-line boundary creation process 400 in accordance with some embodiments. Information about threats, spoofing, attack vectors, vulnerabilities, etc. 410 may be provided to models 420 and/or a training and evaluation database 450 created using DoE techniques. The models 420 may, for example, simulate data 430 from monitoring nodes to be used to compute features that are assembled into a feature vector 440 to be stored in the training and evaluation database 450. The data in the training and evaluation database 450 may then be used to compute decision boundaries 460 to distinguish between normal operation and threatened operation. According to some embodiments, the process 400 may include a prioritization of monitoring nodes and anticipated threat vectors to form one or more data sets to develop decision boundaries. Threat vectors may represent, for example, abnormal values at critical inputs where malicious attacks can be created at the domain level that will make the system go into threatened/abnormal space. In addition, the models 420 may comprise high fidelity models that can be used to create a data set (e.g., a set that describes threat space as "levels of threat conditions in the system versus quantities from the monitoring nodes"). The data 430 from the monitoring nodes might be, for example, quantities that are captured for a length of from 30 to 50 seconds from sensor nodes, actuator nodes, and/or controller nodes (and a similar data set may be obtained for "levels of normal operating conditions in the system versus quantities from the monitoring nodes"). This process will result in data sets for "threat space" and "normal space." The 30 to 50 seconds long quantities may be used to compute features 440 using feature engineering to create feature vectors. These feature vectors can then be used to obtain a decision boundary that separates the data sets for abnormal or threatened space and normal space (used to detect an anomaly such as a cyber-attack).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 5:
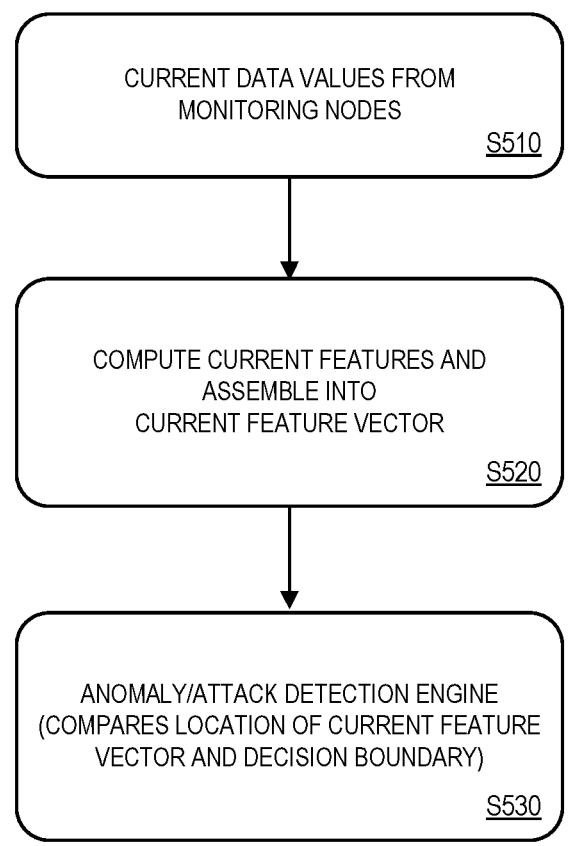
FIG. 5 illustrates a real-time process according to some embodiments.

FIG. 5 illustrates a real-time process to protect an industrial asset according to some embodiments. At S510, current data from monitoring nodes may be gathered (e.g., in batches of from 30 to 50 seconds). At S520, the system may compute features and form feature vectors. For example, the system might use weights from a principal component analysis as features. At S530, an anomaly/attack detection engine may compare location of feature vectors to a decision boundary to make a determination (and output an alert signal if necessary). According to some embodiments, monitoring node data from models (or from real systems) may be expressed in terms of features since features are a high level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple threat nodes and specific locations). Embodiments may incorporate any number of features, with more features allowing the approach to become more accurate as the system learns more about the physical process and threat. According to some embodiments, dissimilar values from threat nodes may be normalized to unit-less space, which may allow for a simple way to compare outputs and strength of outputs.

Figure 6:
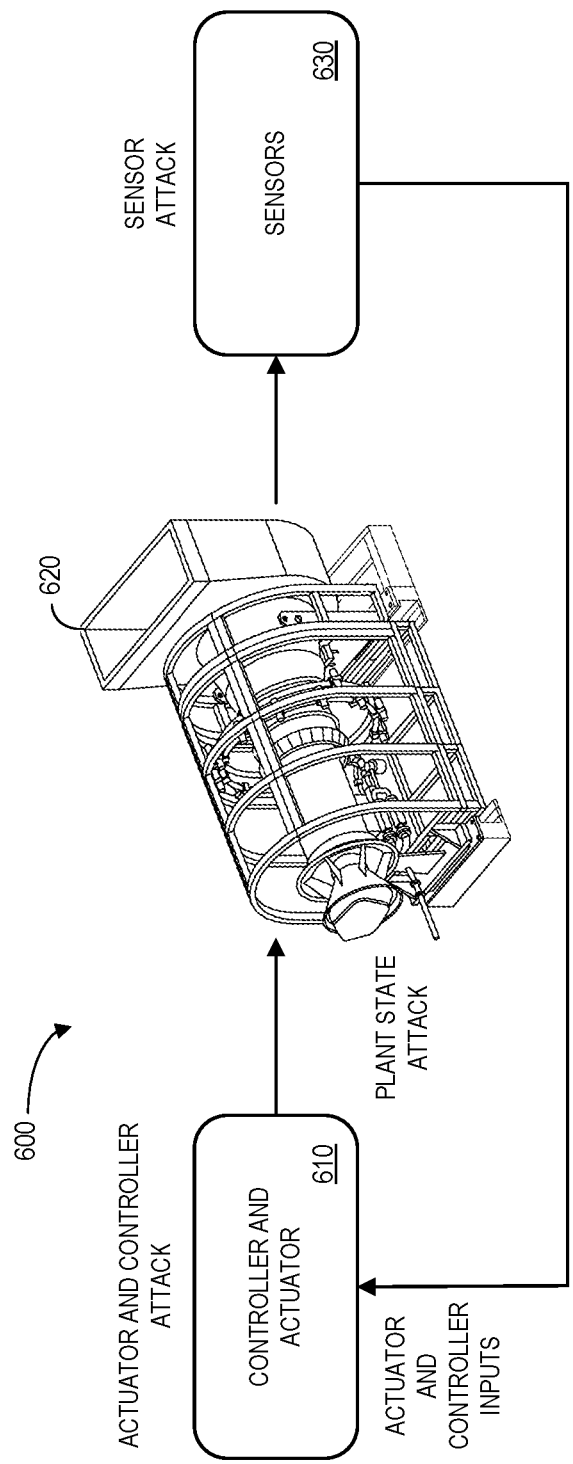
FIG. 6 is an example associated with a gas turbine engine in accordance with some embodiments.

FIG. 6 is an example 600 associated with a gas turbine engine in accordance with some embodiments. In particular, the example includes a controller and actuator portion 610 subject to actuator and controller attacks, a plant portion 620 subject to plant state attacks, and monitoring node sensors 630 subject to threat node attacks. By way of examples only, the monitoring node sensors 630 might comprise physical and/or virtual nodes associated with turbine exhaust, ambient temperature, ambient pressure, an inlet pressure drop, a compressor inlet temperature, a generator output, a fuel pressure, shaft speed, a compressor discharge pressure or temperature, an exhaust gas temperature, emissions, etc. The actuators might be associated with, for example, an inlet guide valve command, a bleed heat valve command, fuel or stop valve position, an ambient pressure, an inlet or exhaust pressure delta, a specific humidity or ambient temperature, a fuel flow, or a temperature of fuel. By monitoring the information in the gas turbine engine system, a threat detection platform may be able to detect malicious intent such as cyber-attacks (e.g., using feature vectors and a decision boundary) that could potentially cause substantial damage.

Figure 7:
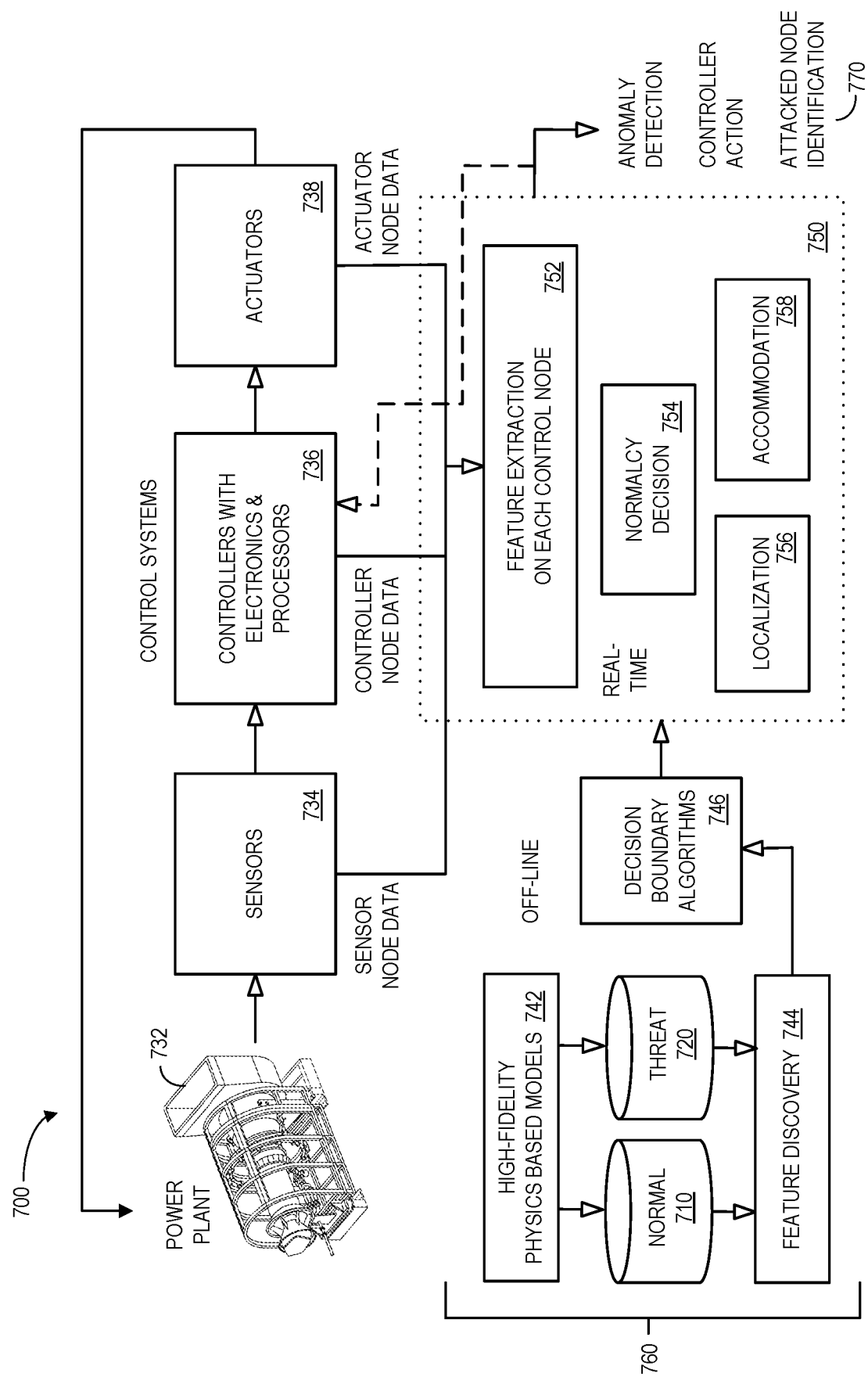
FIG. 7 is threat alert system in accordance with some embodiments.

A cyber-attack detection and localization algorithm may process a real-time turbine signal data stream and then compute features (multiple identifiers) which can then be compared to the sensor specific decision boundary. A block diagram of a system 700 utilizing a sensor specific gas turbine cyber-attack detection and localization algorithm according to some embodiments is provided in FIG. 7. In particular, a power plant 732 provides information to sensors 734 which helps controllers with electronics and processors 736 adjust actuators 738. A threat detection system 760 may include one or more high-fidelity physics based models 742 associated with the power plant 732 to create normal data 710 and/or threat (or abnormal) data 720. The normal data 710 and threat data 720 may be accessed by a feature discovery component 744 and processed by decision boundary algorithms 746 while off-line (e.g., not necessarily while the power plant 732 is operating). The decision boundary algorithms 746 may generate a threat model including decision boundaries for various monitoring nodes in accordance with any of the embodiments described herein. Each decision boundary may separate two data sets in a high dimensional space which is constructed by running a binary classification algorithm, such as a support vector machine using the normal data 710 and threat data 720 for each monitoring node signal (e.g., from the sensors 734, controllers 736, and/or the actuators 738).

A real-time threat detection platform 750 may receive the boundaries along with streams of data from the monitoring nodes. The platform 750 may include a feature extraction on each monitoring node element 752 and a normalcy decision 754 with an algorithm to detect attacks in individual signals using sensor specific decision boundaries, as well rationalize attacks on multiple signals, to declare which signals were attacked, and which became anomalous due to a previous attack on the system via a localization module 756. An accommodation element 758 may generate outputs 770, such as an anomaly detection indication (e.g., threat alert signal), a controller action, and/or a list of attacked monitoring nodes.

During real-time detection, contiguous batches of control signal data may be processed by the platform 750, normalized and the feature vector extracted. The location of the vector for each signal in high-dimensional feature space may then be compared to a corresponding decision boundary. If it falls within the attack region, then a cyber-attack may be declared. The algorithm may then make a decision about where the attack originally occurred. An attack may sometimes be on the actuators 738 and then manifested in the sensor 734 data. Attack assessments might be performed in a post decision module (e.g., the localization element 756) to isolate whether the attack is related to the sensor, controller, or actuator (e.g., indicating which part of the monitoring node). This may be done by individually monitoring, overtime, the location of the feature vector with respect to the decision boundary. For example, when a sensor 734 is spoofed, the attacked sensor feature vector may cross the decision boundary earlier than the rest of the vectors as described with respect to FIGS. 8 through 10. If a sensor is declared to be anomalous, it may be determined that the original attack, such as signal spoofing, occurred on the sensor 734. Conversely, if the signal to the auxiliary equipment was determined to be anomalous first, and then later manifested in the sensor 734 feedback signal, it may be determined that the signal to the equipment was initially attacked.

According to some embodiments, it may be detected whether or not a signal is in the normal operating space (or abnormal space) through the use of localized decision boundaries and real time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 8:
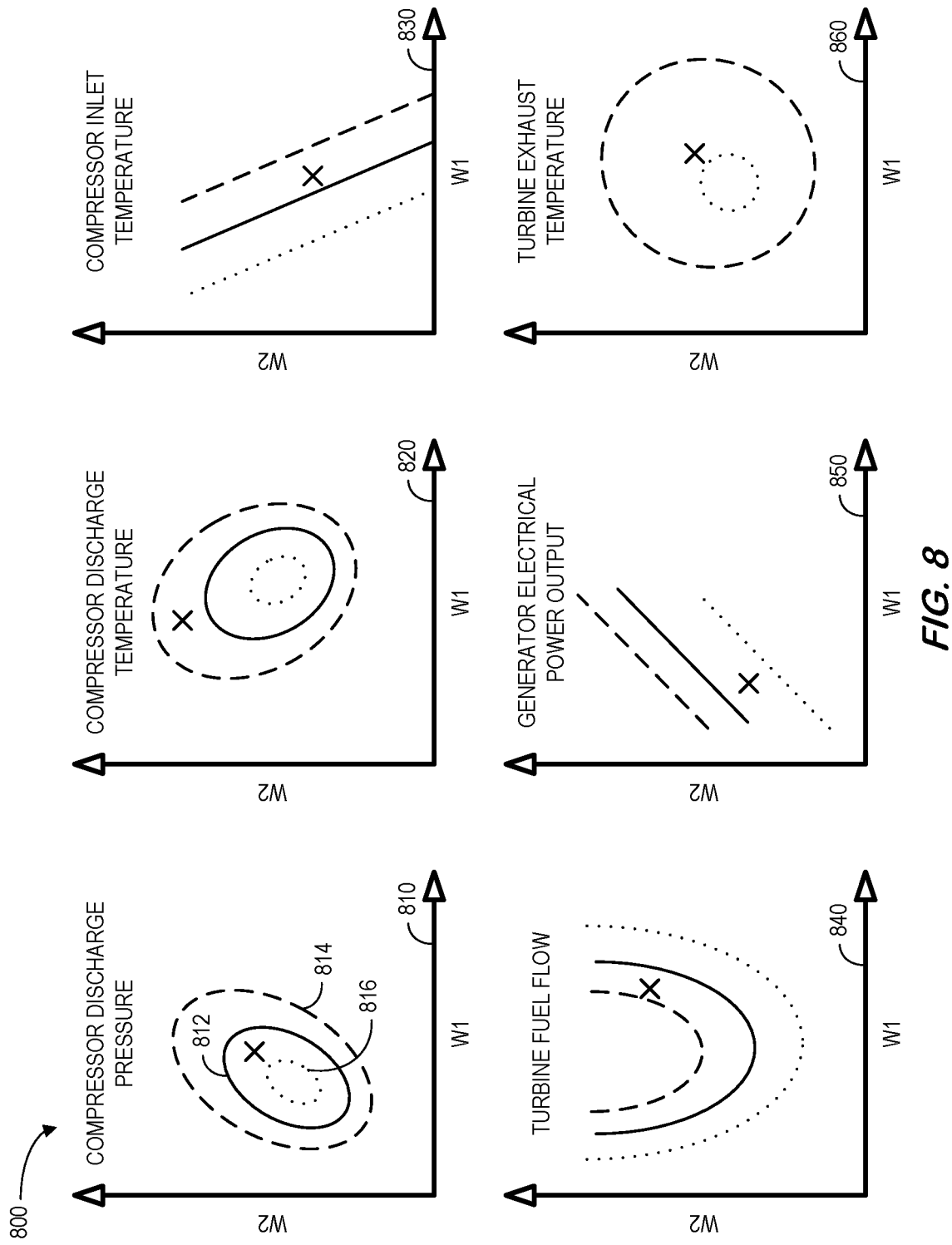
FIGS. 8 through 10 illustrate boundaries and feature vectors for various monitoring node parameters according to some embodiments.

FIG. 8 illustrates 800 boundaries and feature vectors for various monitoring node parameters in accordance with some embodiments. In particular, for each parameter a graph includes a first axis representing value weight 1 ("w1"), a feature 1, and a second axis representing value weight 2 ("w2"), a feature 2. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for compressor discharge pressure 810, compressor discharge temperature 820, compressor inlet temperature 830, turbine fuel flow 840, generator electrical power output 850, and turbine exhaust temperature 860. Each graph includes an average boundary 812 (solid line), minimum boundary 816 (dotted line), and maximum boundary 814 (dashed line) and an indication associated with current feature location for each monitoring node parameter (illustrated with an "X" on the graph). As illustrated in FIG. 8, the current monitoring node location is between the minimum and maximum boundaries (that is, the "X" is between the dotted and dashed lines). As a result, the system may determine that the operation of the industrial asset is normal (and no threat is being detected indicating that the system is currently under attack).

Figure 9:
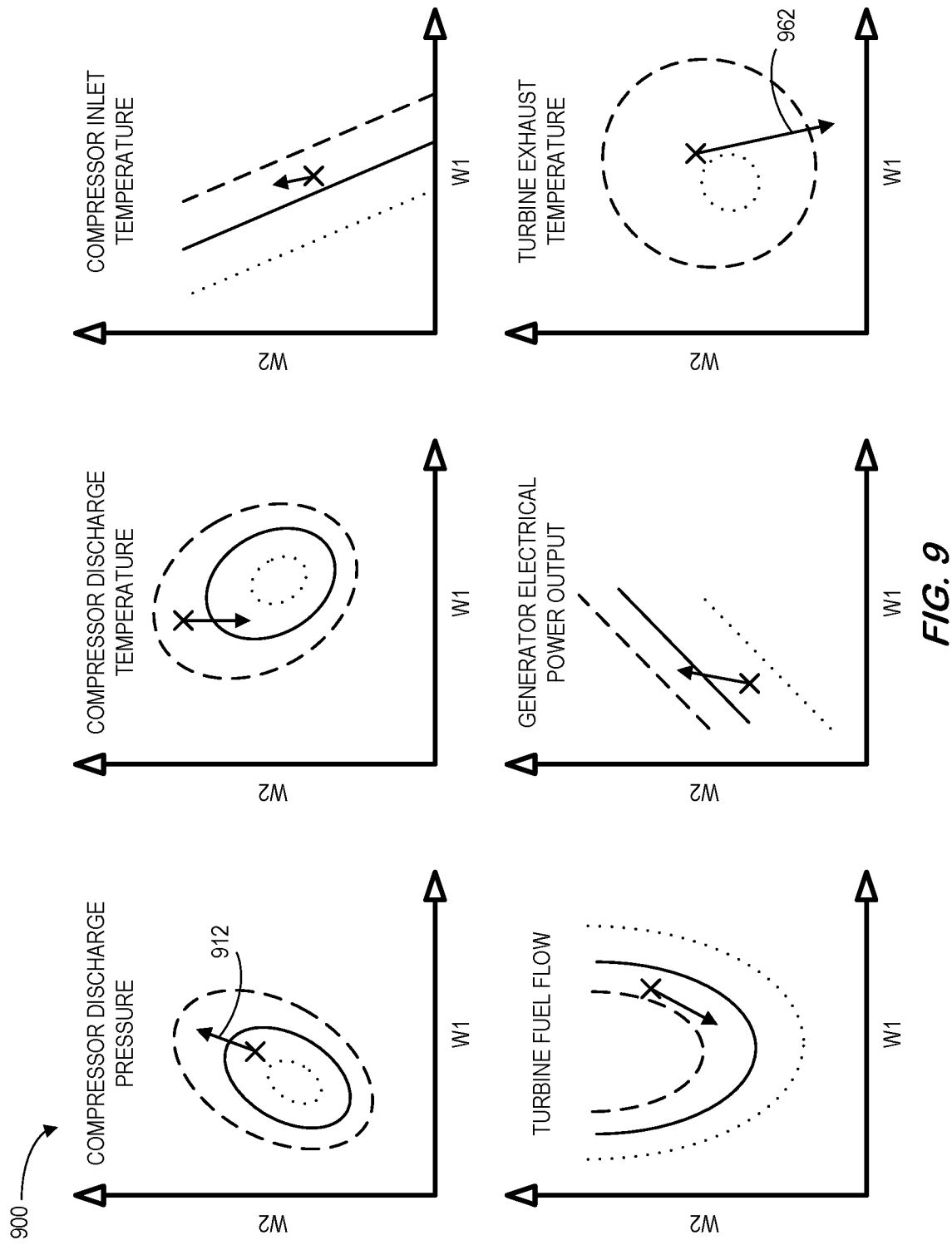

FIG. 9 illustrates 900 subsequent boundaries and feature vectors for these parameters. Consider, for example, a feature vector movement 912 for the compressor discharge pressure. Even though feature vector 912 has moved, it is still within the maximum and minimum boundaries and, as a result, normal operation of that monitoring node may be determined. This is the case for the first five graphs in FIG. 9. In this example, a feature vector movement 962 for the turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary control signal illustrated in FIG. 9 moves 962 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 9, assume that the turbine exhaust temperature signal was attacked. This may cause the system to respond in such a way so as to put other signals into an abnormal state. This is illustrated 1000 in FIG. 10, where the attack has already been detected and now other signals shown to be abnormal. In particular, feature movement for the compressor discharge pressure 1012, compressor discharge temperature 1022, compressor inlet temperature 1032, and turbine fuel flow 1042 have all become abnormal (joining the feature vector for the turbine exhaust temperature 1062). Note that the feature vector for generator electrical power output did not become abnormal. In order to decide whether or not these signals 1012, 1022, 1032, 1042 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed. According to some embodiments, an automated process might be used to determine if an abnormal condition is associated with an independent or independent attack. Note that one signal rationalization might be associated with a system time delay. That is, after a sensor is attacked there might be a period of time before the system returns to a steady state. After this delay, any signal that becomes anomalous might be due to an attack as opposed to the system responding.

The cyber-attack detection and localization algorithms described herein can not only detect abnormal signals of sensors, but may also detect signals sent to auxiliary equipment, control intermediary parameters and/or control logical(s). Moreover, the algorithms may understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system might be used to create acceptable decision boundaries. This could be accomplished, for example, by constructing data sets for normal and abnormal regions by running Design of Experiments ("DoE") experiments on high-fidelity models. A data set for each sensor might comprise a feature vector for given threat values (e.g., turbine speed, thermocouple scale factor, etc.). Full factorial, Taguchi screening, central composite and Box-Behnken are some of the known design methodologies used to create the attack space. When models are not available, these DoE methods are also used to collect data from real-world power generator systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack versus normal" and "degraded versus normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 10:
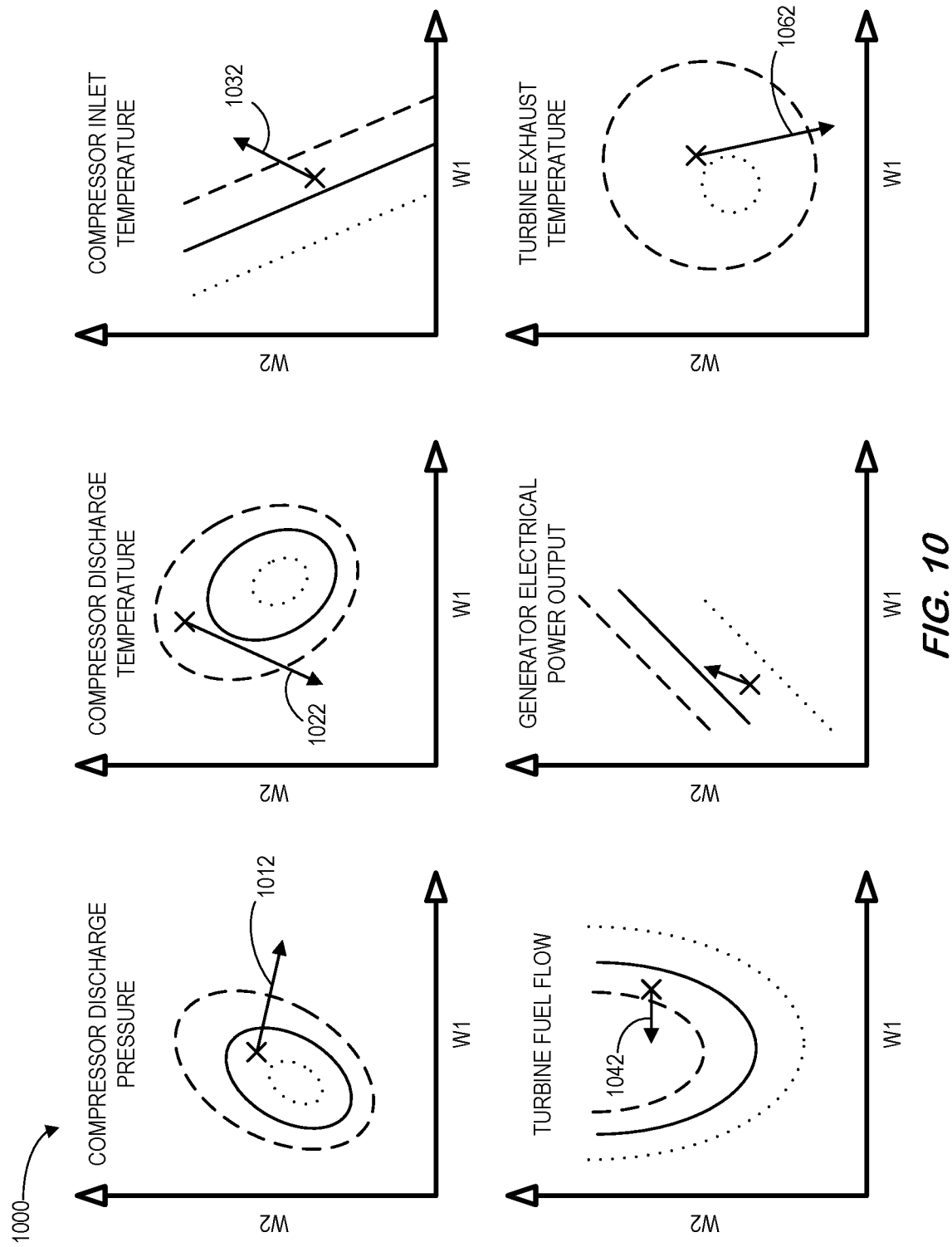

In some cases, multiple vector properties might be examined, and the information described with respect to FIGS. 8 through 10 may be processed to determine if the signal had been trending in a specific direction as the attack was detected (or if it had just been moving due to noise). Had the signal been uniformly trending as the attack took place and afterward, then this signal is a response to the original attack and not an independent attack.

Figure 11:
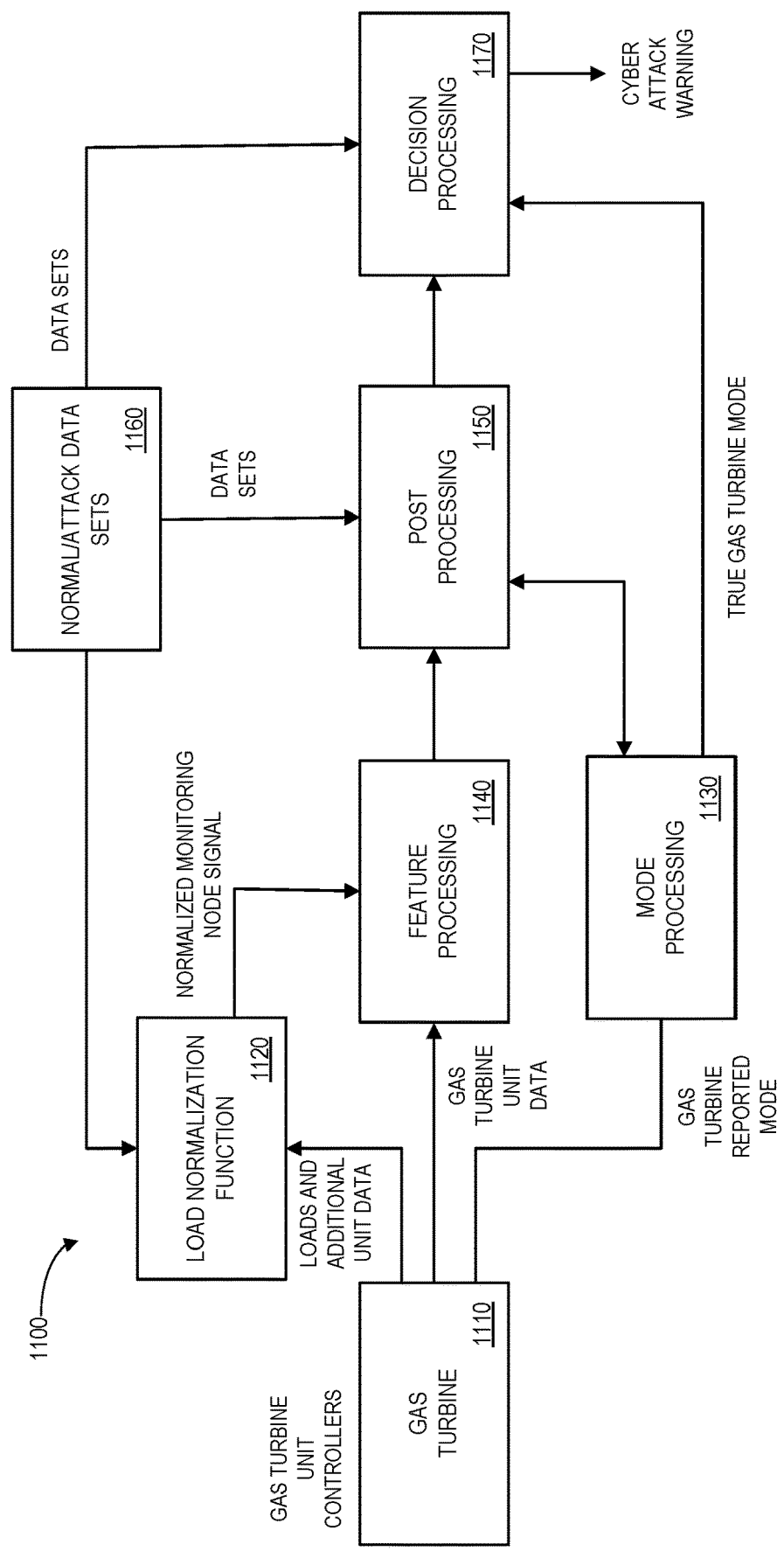
FIG. 11 illustrates a block diagram view of a cyber-attack detection system in accordance with some embodiments.

Note that an industrial asset may be associated with non-linear operations over a range of operating parameters (e.g., loads, temperatures, etc.). As a result, data variations can be substantial and determining when a cyber threat is present based on operation of the control system may be difficult. FIG. 11 illustrates a block diagram view of a cyber-attack detection system 1100 in accordance with some embodiments. In particular, the system 1100 illustrates a gas turbine 1110 (e.g., associated with gas turbine unit controllers) that transmits information about loads (e.g., gas turbine loads, Adaptive Real-time Engine Simulation ("ARES") loads, etc.) to a load normalization function 1120. The gas turbine 1110 may also transmit information to mode processing 1130 (e.g., a gas turbine reported mode of operation) and feature processing 1140 (e.g., gas turbine unit data). The load normalization function 1120 might, for example, transmit a normalized monitoring node signal to feature processing 1140. Post processing 1150 may receive information from feature processing 1140 and transmit data to decision processing 1170 (which can automatically create a cyber-attack warning based at least in part on data sets received from a normal/attack data sets storage unit 1160).

Note that embodiments might utilize temporal and/or spatial normalization. Temporal normalization may provide normalization along a time axis. Spatial normalization may be used to normalize signals along multiple nodes (e.g., sensor axis). In either case, the normalized signals may then be used to perform attack detection using feature extraction and comparisons to normal decision boundaries. Sensor, actuator, and control node time-series data may be processed in substantially real-time to extract "features" from this data. The feature data may then be compared to a decision boundary to determine if a cyber-attack has occurred to the system. A similar approach may be used for detecting attacks in spatially normalized data.

The processing of the real-time data may utilize the normal operating point of the gas turbine 1110. This normal operating point might be determined, for example, based on system operating modes, external conditions, system degradation factor, fuel input, etc. The real-time measured sensor data, actuator data, and control nodes may be processed such that a difference between actual and nominal values is computed and this difference, or delta, is normalized with the expected operating conditions coefficients. Note that turbine load level (e.g., as represented by Mega Watts ("MW")) may be computed based on multiple measurements, and a load may be estimated from an adaptive real time engine model.

According to some embodiments, the following may be performed off-line (not real time). For a given turbine mode, the gas turbine 1110 operation may be simulated using high fidelity models. The load level may be changed from a lowest operating point to a highest operating point (e.g., using step changes every predefined time interval). This simulated data produces a number of normal running data files at varying load levels. Taking one of these files, the load level may be averaged and categorized into a pre-defined load level resolution (e.g., averaged to the nearest 0.25 MW). Using these normalization packets as an input to processing of the time series signals may facilitate dynamic normalization when running in real time. These outputs from the dynamic normalization process may then be used in a feature discovery process.

According to some embodiments, the normalization coefficients are used for a cyber-attack detection system. Note that embodiments may determine a normal operating point for an industrial asset. For example, turbine load level might be a good indicator when the system is operating at a pre-selected load mode. If a temperature mode is used, then normalization may be carried out at the normal temperature as the operating point. This operating point may be used as an input to a dynamic look-up table (and the output of the table may be a normal operating point for the selected load).

Note that feature extraction may process sensor data into feature discovery algorithms (e.g., via a principal component analysis). When principal components are used as features, weights may represent features in reduced dimensions. Consider, for example, temporal normalization of sensor/actuator/control node data (S) performed as follows at every sample along a time axis:

$$S_{normalized} = \frac{S_{nominal} - S_{original}}{\overline{S}_{nominal}}$$

where $\overline{S}_{nominal}$ is a temporal average of a time series signal for normal operating conditions. In this case, a temporal average might be computed for a batch length (e.g., 45 seconds). Note that $S_{original}$ may represent the time series data that require normalization, and $S_{nominal}$ may represent a time series signal for a nominal operating condition. Spatial normalization of sensor/actuator/control node data (S) might be performed at every sample along the sensor axis using the above equation, but with following definition of terms: $\overline{S}_{nominal}$ may represent a spatial average of multiple node signals for nominal conditions along the node axis. There may be, for example, 40 or more nodes involved along the node axis. The spatial average may be computed across multiple nodes for a given sample time or averaged across multiple nodes and across a window of batch length (e.g., 45 seconds across 50 monitoring nodes or 40 milliseconds across 50 nodes). In the spatial normalization, $\overline{S}_{nominal}$ may represent a spatio-temporal average. In this case, $S_{original}$ is the node data that require normalization. Spatio-temporal normalization may also be thought of in two dimensions in which normalized S is a matrix with rows representing spatial axis and columns representing time axis.

The normalized output, $S_{normalized}$ may be expressed as a weighted linear combination of basis functions when certain features are used:

$$S = S_0 + \sum_{j=1}^{N} w_j \Psi_j$$

where $S_0$ is an average sensor output with threats, $w_j$ is the $j^{th}$ weight, and $\Psi_j$ is the $j^{th}$ basis vector. When other knowledge-based, shallow or learning features are used, the normalized output may be further processed to extract corresponding features. To find $S_{nominal}$ under varying load transients, power levels, ambient conditions, fuel conditions, and/or machine life degradation parameters consider the following:

Turbine load transients can change the gas turbine load by up to 10% per minute. Power levels can change dramatically during the sample time period;

Turbine ambient operating conditions [temperature, pressure, humidity] effect power output and sensor outputs;

Fuel conditions (lower heating value) effect energy content of fuel and impacts sensor readings;

machine life degradation (compressor flow scaling, efficiency, turbine flow scalar, efficiency) all effect sensor measurements; and Turbine operating mode may impact a nominal operating point.

Note that the nominal operating conditions may be stored in data tables based on load, ambient conditions, machine performance, etc. The turbine mode, external conditions, fuel input, etc. may then be used as inputs to this selection logic. The tables may be dynamically updated based on machine performance, and the table update may be performed online or offline via preselected logic. According to some embodiments, the turbine digital simulation model may be used to update these tables (e.g., to help account for machine performance and degradation). Turbine load may be used as a main input to the table algorithm. The load may be measured via sensors and used in selection logic to output a load estimate. According to some embodiments, an adaptive real time engine model estimate may be used in addition to measurements to provide a robust surrogate of load.

A turbine measured load condition might be measured in real-time over a time horizon window. A sub-window of data may be used to compute an average load over this sub-window. This averaged power level in MW may then be quantized and used as a table input. Note that a cyber-attack algorithm may utilize a nominal sensor/actuator/control node operating point. Examples of sensors include: turbine inlet temperature, turbine inlet pressure, turbine power, turbine speed, compressor discharge pressure, compressor discharge temperature, fuel flow, and/or turbine exhaust temperature. These nominal points can then be stored in tables (with the table input representing an estimated power level).

Figure 12:
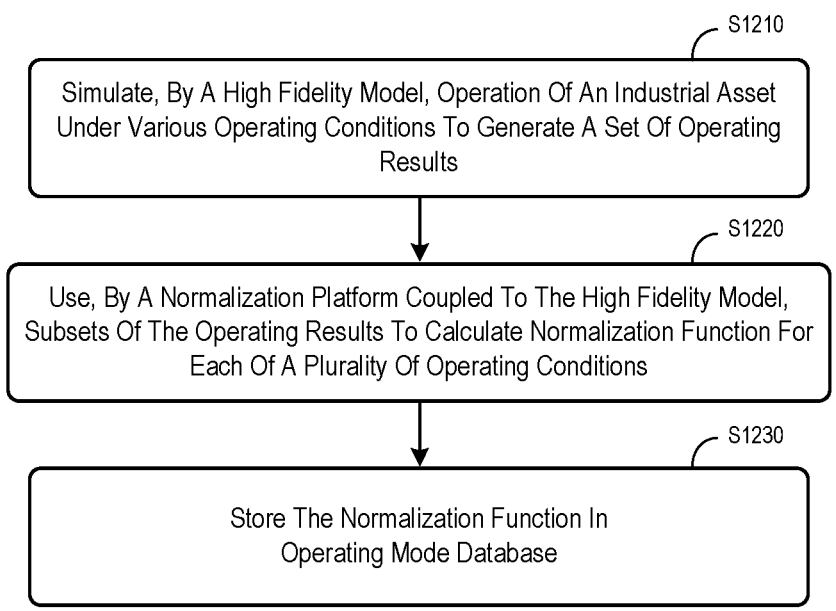
FIG. 12 is an off-line, non-real time, method according to some embodiments.

FIG. 12 is an off-line, non-real time, method according to some embodiments. At S1210, a high fidelity model may simulate operation of an industrial asset under various operating conditions to generate a set of operating results. According to some embodiments, the system may monitor the operation of the industrial asset (e.g., instead of simulation operation). At S1220, a normalization platform coupled to the high fidelity model may use subsets of the operating results to calculate a normalization function (e.g., associated with normalized signals) for each of a plurality of operating conditions. An operating mode database may then be used to store the normalization function and/or normalized signals at S1230.

Figure 13:
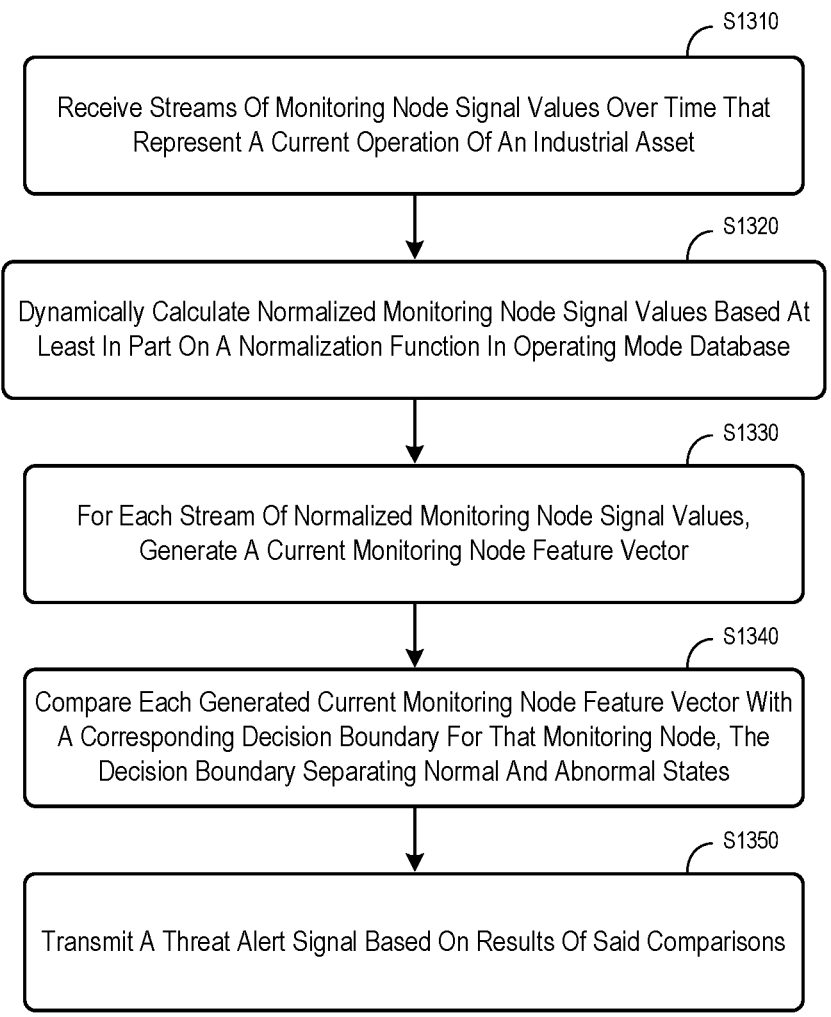
FIG. 13 is a real-time, dynamic method in accordance with some embodiments.

FIG. 13 is a real-time, dynamic method in accordance with some embodiments. At S1310, a plurality of real-time monitoring node signal inputs may receive streams of monitoring node signal values over time that represent a current operation of the industrial asset. At S1320, a threat detection computer platform, coupled to the plurality of real-time monitoring node signal inputs and the operating mode database, may receive the streams of monitoring node signal values and dynamically calculate normalized monitoring node signal values based at least in part on a normalization function in the operating mode database. For each stream of normalized monitoring node signal values, the system may generate a current monitoring node feature vector at S1330. Note that the current monitoring node feature vectors may be associated with dynamic temporal normalization and/or dynamic spatial normalization.

At S1340, the system may compare each generated current monitoring node feature vector with a corresponding decision boundary for that monitoring node (the decision boundary separating a normal state from an abnormal state for that monitoring node). At S1350, the system may automatically transmit a threat alert signal based on results of said comparisons. The alert signal might be transmitted, for example, via a cloud-based application. According to some embodiments, the alert signal may be transmitted via one or more of a cloud-based system, an edge-based system, a wireless system, a wired system, a secured network, and a communication system.

By way of example only, the industrial asset control system might be associated with a gas turbine. In this case, the operating conditions might be associated with gas turbine loads and/or gas turbine temperatures. Other gas turbine parameters might include: (i) an operating mode, (ii) an external condition, (iii) a system degradation factor, (iv) fuel input, (v) a turbine inlet temperature, (vi) a turbine inlet pressure, (vii) a turbine power, (viii) a turbine speed, (ix) compressor discharge pressure, (x) compressor discharge temperature, (xi) fuel flow, and/or (xii) turbine exhaust temperature. As another example, the industrial asset might be associated with a computer network and the operating conditions may be associated with information packet transmission characteristics (e.g., packet size, latency, etc.).

Note that there could be many different types of attacks that an industrial control system may be subjected to with malicious intent. The types of attacks such as espionage attacks, denial of service attacks, deception attacks (e.g., covert/stealthy attack, zero dynamics attack, false data injection attack, replay attack) are a short sampling of the threats that exist. Existing approaches may not adequately detect in an automatic manner and at high speed (e.g., at substantially sampling speed). Note that high speed detection may be very useful (e.g., it might be used to neutralize the effects of attacks on the system while the attacks are still in progress).

Attacks are generally simultaneous (i.e., more than one actuator/sensor/parameters may be changed at one time) and the consequences on system behavior or damage to the system may not be visible immediately on operator console. Some approaches to cyber-attack detection might analyze a batch of data (e.g., approximately 45 seconds long) find high level representations of time series signals. As a result, high speed detection (e.g., at substantially sampling speed) is not possible. According to some embodiments described herein, instead of using a batch of time series signal to extract features, the system may use spatial signals (i.e., across large number of multiple sensors) at a specific sample time. The system may then process the spatial signals through a decision boundary which is computed a priori to assess whether the system is in normal or abnormal operational state—thereby facilitating rapid attack detection.

Figure 14A:
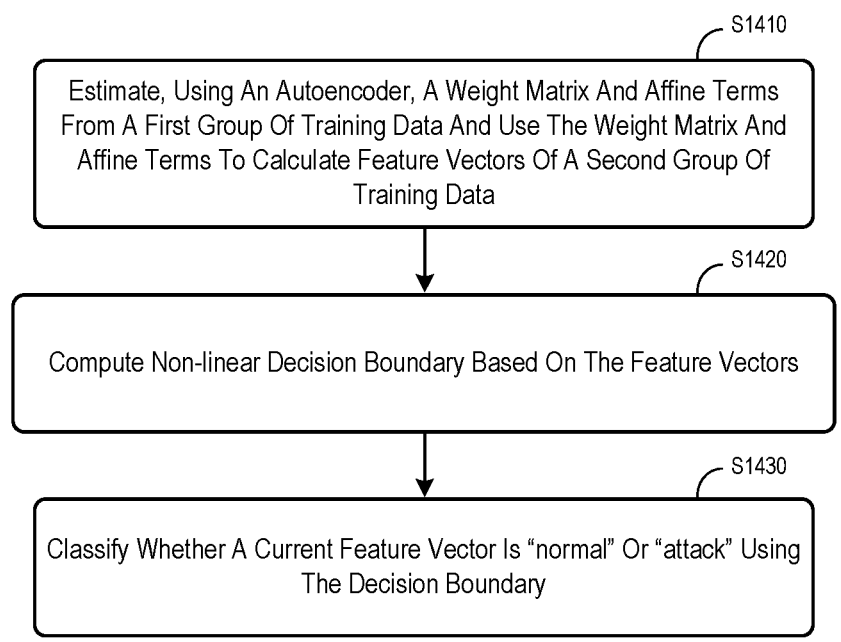
FIG. 14A is a method associated with an autoencoder according to some embodiments.

Note that the methods described herein may be applicable across a wide range of situations such as multiple sensor faults, multiple sensor/actuator attacks, undesirable tampering of HMI data, degradation in sensor calibration, etc. FIG. 14A is a method associated with an autoencoder according to some embodiments. The method may, for example, detect anomalies in industrial assets (e.g., a power grid, power generation apparatus, etc.) such as performance degradation due to stealthy attacks (simultaneous or single) or system faults at relatively high speed (e.g., at the sample rate of the monitoring sensor nodes of the control system). At S1410, an autoencoder may estimate values for W-matrix (weight matrix) and b-vector (affine terms) from a first group of training data. The W-matrix and b-vector may then be used to calculate the features from a second group of training data. Although an autoencoder is used in some examples described herein, note that embodiments might be associated with any type of deep learning model. For example, a deep learning model associated with a neural network, a shallow autoencoder, or a deep learning autoencoder (with many layers) might be utilized. At S1420, a non-linear decision boundary is computed to the feature vectors. At S1430, the system may use the decision boundary to classify whether a feature vector of new data corresponds to "normal" or "attack" data. Note that a preprocessing step might be performed prior to S1410 to get the data into a proper form for the autoencoder.

For high speed detection, an algorithm associated with a De-noised Auto-Encoder ("DAE") might be used to protect an industrial asset, such as a gas turbine. For example, the DAE might learn features from normal and abnormal data sets. Through the input of many examples of normal data, the DAE algorithm may learn a representation of the data set in reduced dimensions. This representation may be a non-linear transform of the raw data that encapsulates the information of the original data. Such an approach might be appropriate, for example, because examples of attack data may be less common as compared to usual normal operation data.

As used herein, the term "autoencoder" may refer to a feedforward artificial neural network. Note that there may be two parts to this feature learning algorithm: an encoder and a decoder. That is, the raw data may first be encoded or transformed into another space and then decoded back to its original space. In the encoder step, the input raw data (i.e., sensor time series data) is transformed into hidden variables (features) through a non-linear transformation. The non-liner transformation is as follows:

$$y = f_\theta(x) = s(Wx+b)$$

where W is an m×n weight matrix and b is a vector of size m. The term n is the dimension of the input vector and m is equal to the number of hidden variables or features. The terms is a logistic sigmoid function and the term x represents a data vector. In a gas turbine example, W may have a size equal to 50×17 (where 50 represents a length of training data set and 17 represents a number of sensor nodes). During the encoder step, the values of W and b may be determined. By way of example, a training data set might consist of 100 files of "normal" data and 20 files of "attack data." The "normal" and "attack" data files might contain, for example, 20 sensors each. The "normal" files might have data for 2 minutes (with data sampled every 40 milliseconds). 5 minutes of data from "normal" files and 2 minutes from "attack" files may be used, for example, in a gas turbine simulation data set. For the algorithm, the system may normalize the sensor values against a base vector (e.g., a vector of 20 whose values came from a time average of a base file that had no anomalies).

In the decoder step, the original input may be reconstructed from the hidden variables (that is, the output of the encoder step):

$$z = g_\theta(y) = s(W'+d')$$

where W' may equal $W^T$, the transpose of W (an optional constraint such as weights). The term d' may be determined from the data set.

An error between the decoder's transformation of the features, z, and the original input, referred to as a "cost function," may then be computed. For this error function a cross-entropy loss may be used:

$$L(x,z) = -\Sigma_j [x_j \log z_j + (1-x_j) \log(1-z_j)]$$

Note that a mean squared error might be used instead of the cross-entropy loss. The algorithm may then be iterated multiple times such that W, b and d' are updated until the cost function is minimized using the training data set represented by $x_j$ (which corresponds to training data set). The terms W, b, and d' may be updated using a backpropagation algorithm with stochastic gradient descent. This process may iteratively solve the optimization problem of the cost function. Note that auto encoders may run into local optimums because this is a non-convex problem.

Figure 14B:
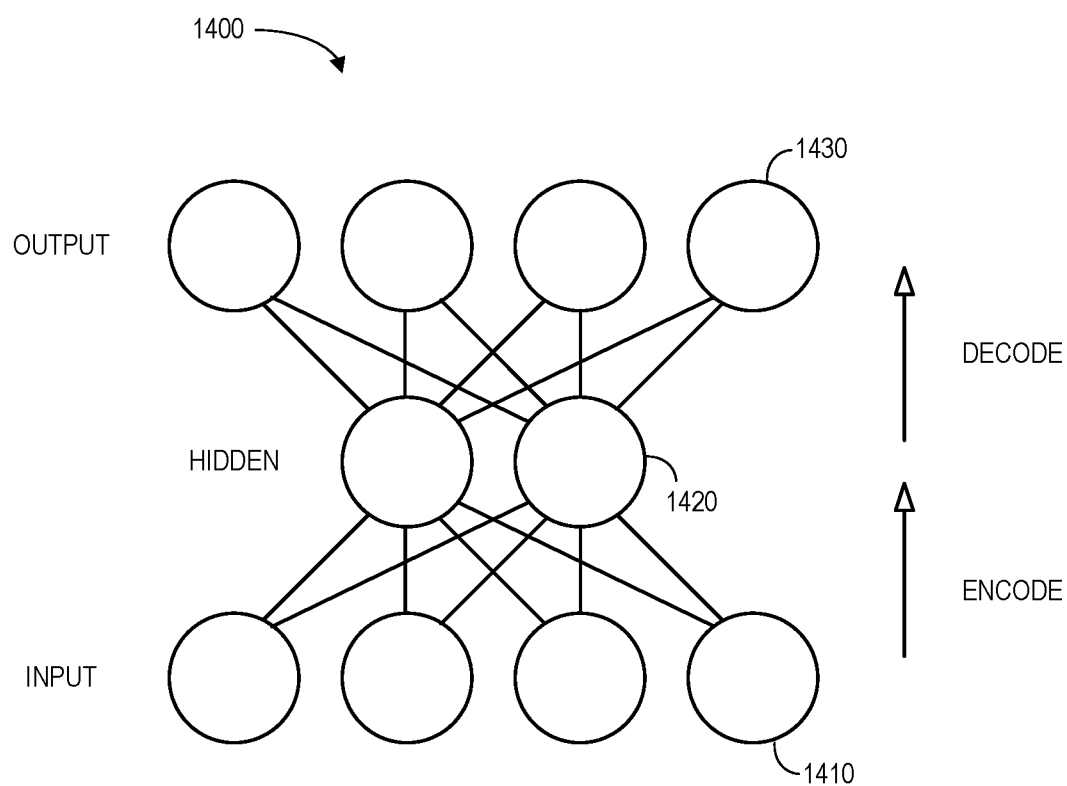
FIG. 14B illustrates layers of an autoencoder algorithm in accordance with some embodiments.

FIG. 14B illustrates layers of an autoencoder algorithm 1400 in accordance with some embodiments. In particular, an encode process turns raw inputs 1410 into hidden layer 1420 values. A decode process turns the hidden layer 1420 values into output 1430. Note that the number of hidden nodes can be specified and correspond to number of features to be learned. According to some embodiments, an autoencoder may be constructed as an optimization problem. For example, the error function, mean-squared error to minimize and find W, b, and d' may be performed as follows:

$$\min E(W,b,d') = \min_{W,b,d'} \Sigma \Sigma_{j=1}^P \|x_j - g_\theta(f_\theta(x_j))\|^2$$

where $x_j$ corresponds to samples of data and P is equal to the number of samples.

Note that an autoencoder implementation may use the cross entropy error function instead of mean squared error. Moreover, an expected value may be required when using cross entropy:

$$\min E(W,b,d') = \min_{W,b,d'} E[L(x,z)]$$

where L(x, z) is the cross-entropy loss L(x, z) shown above.

Thus, embodiments described herein may be associated with three steps. In step one, an autoencoder may estimate values for W and b from a first group of training data. In step two, W and b may be used to calculate the features from a second group of training data. Both training data sets may be labelled corresponding to "attack" or "normal." and the non-linear decision boundary may be computed using feature vectors from the second training data set. In step three, the system may then compute features using W and b for 20×1 test/evaluation data obtained at a given time sample. This feature vector may be compared to the decision boundary to perform decision for that sample set. According to some embodiments, each data set (i.e., training and evaluation data sets) may be pre-processed to normalize the data.

There may be two different approaches to presenting the training inputs: (1) all of the data might be used (spanning all of the data files and all time samples in each data file for 2/5 minutes of data), or (2) only a sampled subset of the time samples might be used. In the first approach, the number of samples used is equal to the number of data files multiplied by the time samples in each normal (or attack) data file. Alternatively, only a sampled version might be used (e.g., a sampled might be taken every 5 seconds). In some embodiments, a five-fold cross validation might be used such that training data is broken into five equal parts. Of these five parts, the system may pick one part for testing and train on the remaining four parts. This process might be done five times (picking a different part each time for the training). After the system cross-validates and tunes the parameters, the official evaluation data may be tested.

Table I illustrates test results associated with: an autoencoder having 50 hidden layers; an autoencoder having 17 hidden layers, an autoencoder having 12 hidden layers, and no autoencoder. Once raw training data was converted into features, a decision boundary was fitted on the feature vectors using various decision/classification boundaries: Quadratic Discriminant Analysis ("QDA"); Polynomial (degree 3); Gaussian Naïve Bayes; Linear Discriminant Analysis ("LDA"); and Radial Basis Functions ("RBF"). For each scenario, Table I lists the False Positive Rate ("FPR") and True Positive Rate ("TPR") as: (FPR, TPR). That is, "(0.0, 0.99.9)" means that 0% of normal data is labelled as attack and 99.9% of attack data is labelled as attack. The second pair of terms represents the variance of FPR and TPR.

TABLE I

| | Autoencoder (hidden = 50) | Autoencoder (hidden =17) | Autoencoder (hidden = 12) | No Autoencoder |
|---|---|---|---|---|
| | | QuadraticDiscriminantAnalysis | | |
| Test CrossValidation | 0.0, 99.9 (2.2, 99.9)$_{(2.25e-3,\ 1.175e-3)}$ | 0.02, 99.9 (2.2, 99.5)$_{(1.65e-3,\ 4.84e-3)}$ | 0.02, 99.5 (2.2, 97.5)$_{(1.55e-3,\ 3.85e-3)}$ | 0.0, 99.9 (2.2, 99.8)$_{(2.4e-3,\ 2.6e-3)}$ |
| | | Polynomial (degree 3) | | |
| Test CrossValidation | 1.4, 99.9 (1.9, 99.8)$_{(1.8e-2,\ 6.9e-3)}$ | 1.3, 99.9 (5.9, 99.9)$_{(7.91e-2,\ 1.98e-3)}$ | 4.0, 99.8 (5.6, 99.9)$_{(2.22e-3,\ 5.6e-3)}$ | 4.0, 0.0 (22.2, 100)$_{(1.6e-4,\ 0.0)}$ |
| | | GaussianNB | | |
| Test CrossValidation | 4.1, 99.5 (11.2, 97.8)$_{(2.3e-4,\ 3.5e-4)}$ | 5.5, 99.9 (22.2, 98.7)$_{(1.76e-2,\ 3.19e-2)}$ | 5.95, 99.1 (22.2, 97.7)$_{(2.24e-2,\ 2.38e-1)}$ | 0.0, 99.9 (3.8, 99.9)$_{(1.76e-1,\ 0.0)}$ |
| | | LinearDiscriminantAnalysis | | |
| Test CrossValidation | 3.1, 98.6 (5.9, 99.2)$_{(4.70e-2,\ 8.08e-2)}$ | 9.3, 97.4 (7.0, 97.9)$_{(9.41e-2,\ 6.66e-2)}$ | 19.5, 98.0 (10.8, 97.8)$_{(1.25e-1,\ 8.53e-1)}$ | 0.1, 75.0 (0.5, 71.3)$_{(8.36e-3,\ 7.53e-1)}$ |
| | | RBF (gamma = 4) | | |
| Test CrossValidation | 2.4, 96.0 (2.1, 99.5)$_{(3.22e-2,\ 1.12e-1)}$ | 2.5, 97.0 (5.0, 99.9)$_{(2.80e-1,\ 1.05e-3)}$ | 2.6, 95.8 (7.4, 99.9)$_{(5.2e-2,\ 6.4e-3)}$ | 4.0, 100 (11.1, 100)$_{(1.53e-2,\ 0.0)}$ |

Thus, embodiments may detect multiple simultaneous attacks or faults at substantially the sampling speed. Moreover, embodiments may ignore temporal dynamics as the data at different times is treated equally and may have the potential to bring an asset back to normal operation continuously on a sample-by-sample basis once the attacks are detected. Such an implementation may provide protection for any large scale cyber-physical system, such as an industrial asset. Moreover, the detection framework may utilize tools for easy proliferation to different types of systems (e.g., gas turbines, steam turbines, wind turbines, aviation engines, locomotive engines, power grid, etc.) in multiple geolocations. In addition, the feature-based approach with deep learning algorithms may allow for detection of a wide range of cyber-threats at speed (e.g., stealth, replay, covert, injection attacks, etc.).

Figure 15:
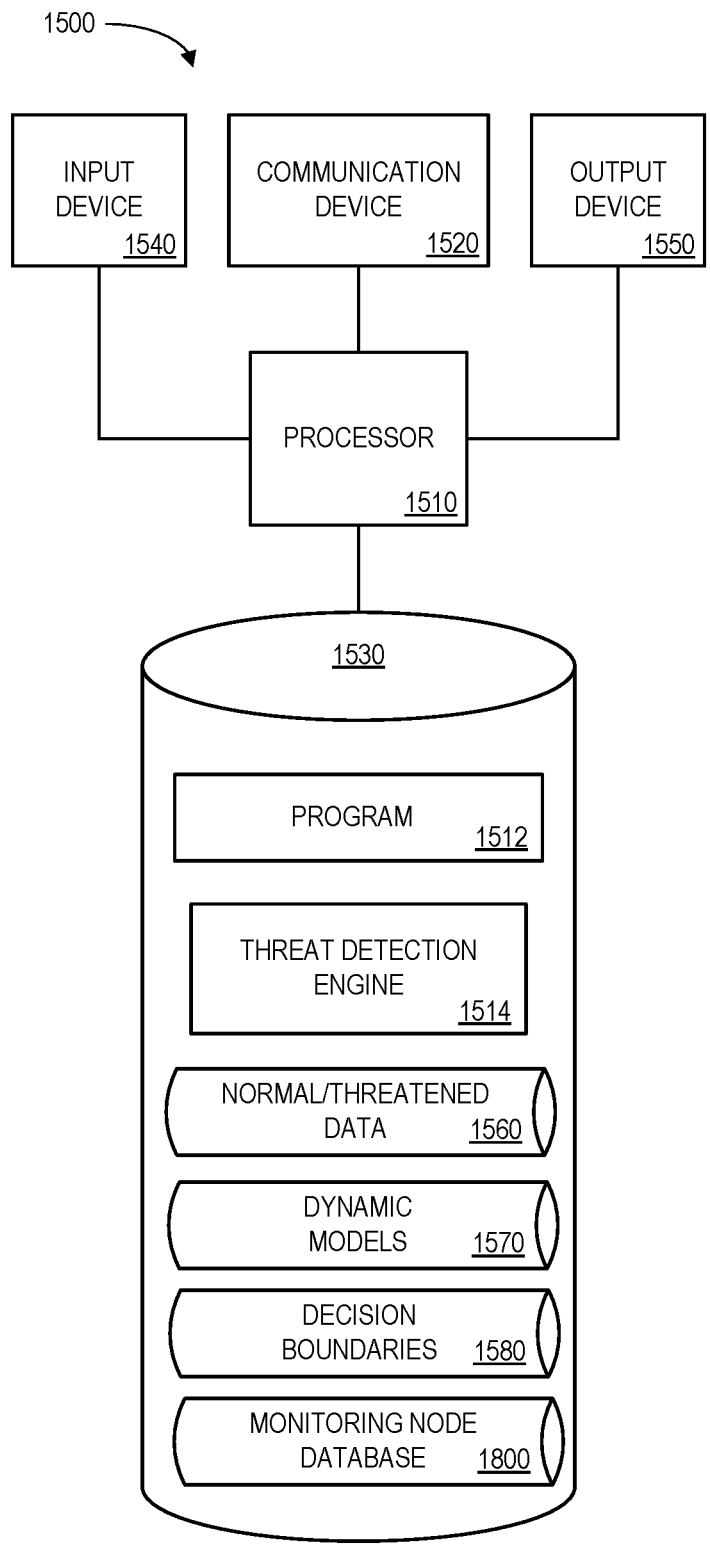
FIG. 15 is a block diagram of an industrial asset protection platform according to some embodiments of the present invention.

The embodiments described herein may be implemented using any number of different hardware configurations. For example, FIG. 15 is a block diagram of an industrial asset protection platform 1500 that may be, for example, associated with the system 150 of FIG. 1. The industrial asset protection platform 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote monitoring nodes, user platforms, etc. The industrial asset protection platform 1500 further includes an input device 1540 (e.g., a computer mouse and/or keyboard to input sensor configuration data, etc.) and/an output device 1550 (e.g., a computer monitor to render a display, provide alerts, transmit recommendations, and/or create reports). According to some embodiments, a mobile device, monitoring physical system, and/or PC may be used to exchange information with the industrial asset protection platform 1500.

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1512 and/or a threat detection engine 1514 for controlling the processor 1510. The processor 1510 performs instructions of the programs 1512, 1514, and thereby operates in accordance with any of the embodiments described herein. For example, the processor 1510 may receive a series of normal monitoring node values and a series of abnormal monitoring node values. A first subset of the received monitoring node values may be processed with a deep learning model to determine a weight matrix and affine terms. The weight matrix, affine terms, and a second subset of the received monitoring node values may then be used by the processor 1510 to compute feature vectors. At least one decision boundary for a threat detection model may be automatically calculated by the processor and output based on the computed feature vectors (the decision boundary separating a normal state from an abnormal state for that monitoring node). The decision boundary may then be used to detect normal and abnormal operation of an industrial asset.

The programs 1512, 1514 may be stored in a compressed, uncompiled and/or encrypted format. The programs 1512, 1514 may furthermore include other program elements, such as an operating system, clipboard application, a database management system, and/or device drivers used by the processor 1510 to interface with peripheral devices.

As used herein, information may be "received" by or "transmitted" to, for example: (i) the industrial asset protection platform 1500 from another device; or (ii) a software application or module within the industrial asset protection platform 1500 from another software application, module, or any other source.

In some embodiments (such as the one shown in FIG. 15), the storage device 1530 further stores normal/threatened data 1560, dynamic models 1570, decision boundaries 1580, and/or a monitoring node database 1600. An example of a database that may be used in connection with the industrial asset protection platform 1500 will now be described in detail with respect to FIG. 16. Note that the database described herein is only one example, and additional and/or different information may be stored therein. Moreover, various databases might be split or combined in accordance with any of the embodiments described herein.

Figure 16:
FIG. 16 is a tabular portion of an operating mode database in accordance with some embodiments.

Referring to FIG. 16, a table is shown that represents the monitoring node database 1600 that may be stored at the industrial asset protection platform 1500 according to some embodiments. The table may include, for example, entries identifying sensor nodes (and other types of nodes) associated with an industrial asset. The table may also define fields 1602, 1604, 1606, 1608, 1610, 1612, 1614 for each of the entries. The fields 1602, 1604, 1606, 1608, 1610, 1612, 1614 may, according to some embodiments, specify: a monitoring node identifier 1602, a time series of values 1604, a W-matrix value 1606, a b-vector value 1608, one or more feature vectors 1610, a classification algorithm 1620, and decision boundary parameters 1614. The monitoring node database 1600 may be created and updated, for example, off-line (non-real time) when a new physical system is monitored or modeled.

The monitoring node identifier 1602 may be, for example, a unique alphanumeric code identifying a node to be monitored (e.g., associated with a sensor). The time series of values 1604 may represent, for example, normal and/or abnormal data from a sensor or other monitoring node. The W-matrix value 1606 and a b-vector value 1608 might comprise a weight matrix and affine terms selected to minimize a cost function associated with an autoencoder or other deep learning technique. The feature vectors 1610 may be generated from the time series of values 1604, such as by use of an autoencoder or any other approach described herein. The classification algorithm 1612 may indicate how the decision boundary parameters 1614 were selected to fit the feature vectors as appropriate.

Thus, embodiments may enable the automatic high speed detection of multi-class abnormal operations using real-time signals from monitoring nodes. Moreover, the detection framework may allow for the development of tools that facilitate proliferation of the invention to systems in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new earnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to industrial asset control system operators so that an attack may be thwarted (or the effects of the attack may be blunted), reducing damage to equipment.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 17:
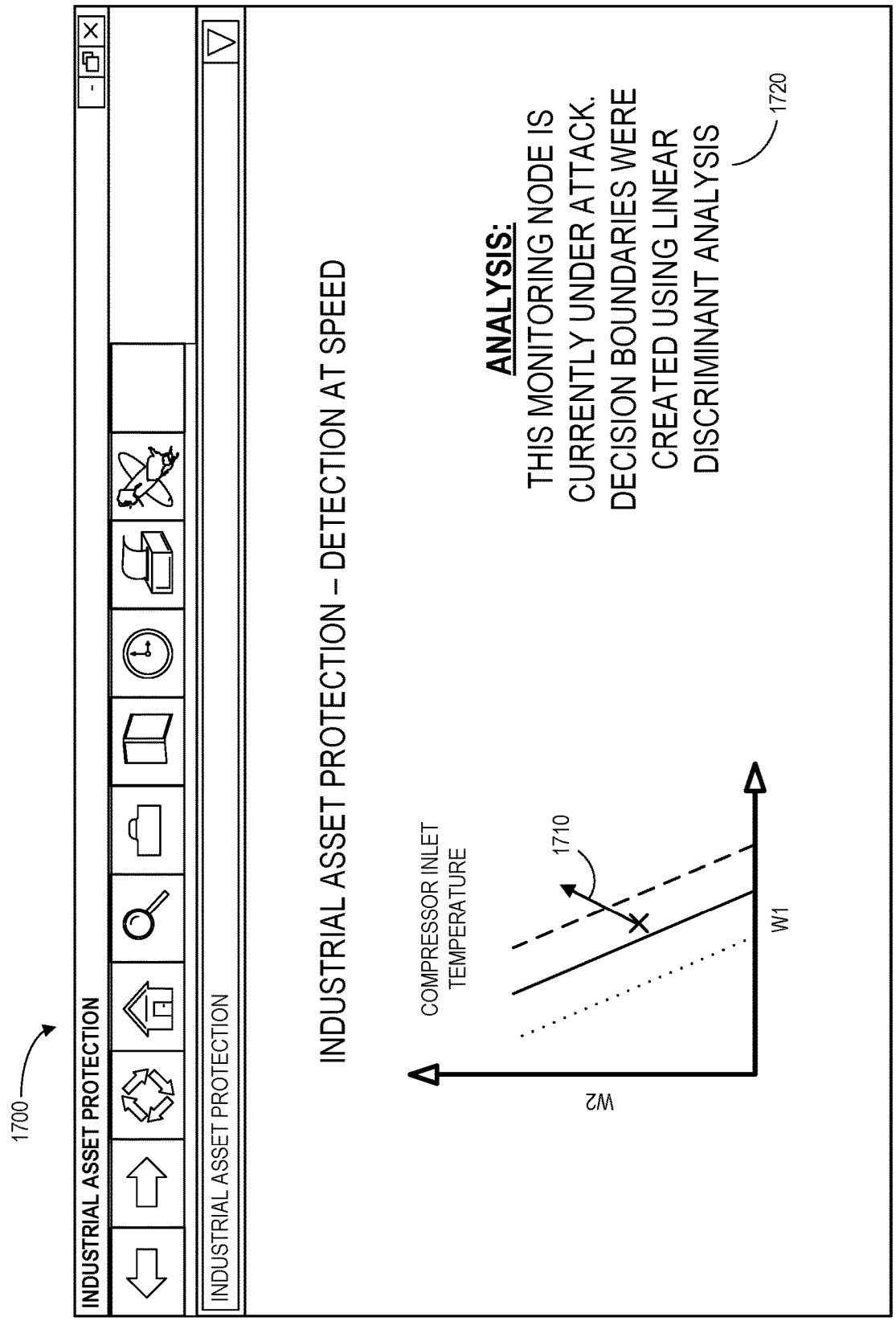
FIG. 17 is a display according to some embodiments.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on gas turbine generators, any of the embodiments described herein could be applied to other types of assets, such as damns, the power grid, military devices, etc. Moreover, note that some embodiments may be associated with a display of monitoring node threat data to an operator. For example, FIG. 17 illustrates an interactive Graphical User Interface ("GUI") display 1700 that might display monitoring node information (e.g., including a feature vector 1710 and decision boundaries) along with an automatically generated analysis 1720 of the data. According to some embodiments, information about attack statuses may be interwoven between different industrial asset plants. For example, one power plant might be aware of the status of other nodes (in other power plants) and such an approach might help thwart coordinated cyber-threats.

In addition to automatic threat detection, some embodiments described herein might provide systems with an additional cyber layer of defense and be deployable without custom programming (e.g., when using operating data). Some embodiments may be sold with a license key and could be incorporated as monitoring service. For example, boundaries might be periodically updated when equipment at an industrial asset plant is upgraded.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to protect an industrial asset, comprising:
   a normal space data source storing, for each of a plurality of monitoring nodes, a series of normal monitoring node values over time that represent normal operation of the industrial asset
   an abnormal space data source storing, for each of the plurality of monitoring nodes, a series of abnormal monitoring node values over time that represent abnormal operation of the industrial asset; and
   a threat detection model creation computer, coupled to the normal space data source and the abnormal space data source, to:
   (i) receive the series normal monitoring node values,
   (ii) receive the series of abnormal monitoring node values,
   (iii) process at least some received monitoring node values with a deep learning model to determine parameters of the deep learning model, wherein the deep learning model is an autoencoder and received monitoring node values are processed by an encoder of the autoencoder,
   (iv) use the parameters of the deep learning model to compute feature vectors of the monitoring node values, and
   (v) automatically calculate and output at least one decision boundary for a threat detection model based on the computed feature vectors, the decision boundary separating a normal state from an abnormal state for that monitoring node, wherein the threat detection model creation computer is further to calculate a cost function, associated with a cross-entropy loss or mean squared error, minimized using a back-propagation algorithm with stochastic gradient descent.

2. The system of claim 1, wherein the parameters of the deep learning model comprise a weight matrix and affine terms.

3. The system of claim 1, wherein feature vectors are spatial along a plurality of monitoring nodes.

4. The system of claim 1, wherein the parameters of the deep learning model are computed from a first subset of received monitoring node values.

5. The system of claim 4, wherein the feature vectors are computed from a second subset of the monitoring node values.

6. The system of claim 1, wherein the autoencoder is associated with at least one of: (i) a de-noised autoencoder, and (ii) a feedforward artificial neural network.

7. The system of claim 1, wherein the features are computed using the following non-linear transformation:

$$y = f_\theta(x) = s(Wx+b)$$

wherein W is a m×n weight matrix and b is a vector of size m, n is the dimension of an input vector, m is equal to the number of hidden variables or features, s is a logistic sigmoid function, and x represents data vector.

8. The system of claim 1, wherein the decision boundary calculation is associated with at least one of: quadratic discriminant analysis, a polynomial of degree three, Gaussian naïve Bayes, linear discriminant analysis, and a radial basis function.

9. The system of claim 1, wherein at least one of the series of normal monitoring node values and the series of abnormal monitoring node values are associated with a high fidelity equipment model.

10. The system of claim 1, wherein at least one decision boundary exists in a multi-dimensional space and is associated with at least one of: (i) a dynamic model, (ii) design of experiment data, (iii) machine learning techniques, (iv) a support vector machine, (v) a full factorial process, (vi) Taguchi screening, (vii) a central composite methodology, (viii) a Box-Behnken methodology, (ix) real-world operating conditions, (x) a full-factorial design, (xi) a screening design, and (xii) a central composite design.

11. The system of claim 1, wherein the threat detection model creation computer is further to perform a pre-processing normalization of the received monitoring node values for the autoencoder.

12. The system of claim 1, further comprising:
a plurality of real-time monitoring node signal inputs to receive streams of monitoring node signal values over time, at a sampling speed, that represent a current operation of the industrial asset; and
a threat detection computer platform, coupled to the plurality of real-time monitoring node signal inputs and the operating mode database, to perform the following at substantially the sampling speed:
(i) receive the streams of monitoring node signal values,
(ii) for each stream of monitoring node signal values, generate a current monitoring node feature vector,
(iii) compare each generated current monitoring node feature vector with the corresponding decision boundary for that monitoring node, and
(iv) automatically transmit a threat alert signal based on results of said comparisons.

13. The system of claim 12, wherein feature vectors are spatial along a plurality of monitoring nodes.

14. The system of claim 12, wherein each stream of received monitoring node signal values is normalized based at least in part on a normalization function.

15. The system of claim 14, further comprising:
a high fidelity model to simulate operation of the industrial asset under various operating conditions to generate a set of operating results;
a normalization platform coupled to the high fidelity model to calculate a normalization function for each of a plurality of operating conditions; and
an operating mode database to store the normalization function.

16. The system of claim 15, wherein current monitoring node feature vectors are associated with at least one of: dynamic temporal normalization, and dynamic spatial normalization.

17. The system of claim 15, wherein normalization is performed as follows:

$$S_{normalized} = \frac{S_{nominal} - S_{original}}{\overline{S}nominal}$$

where $\overline{S}_{nominal}$ is a temporal average of a time series signal for normal operating conditions, and $S_{original}$ represents time series data requiring normalization.

18. The system of claim 17, wherein the normalized output $S_{normalized}$ is expressed as a weighted linear combination of basis functions as follows:

$$S = S_0 + \sum_{j=1}^{N} w_j \Psi_j$$

where $S_0$ is an average sensor output with threats, $w_j$ is the $j^{th}$ weight, and $\Psi_j$ is the $j^{th}$ basis vector.

19. The system of claim 15, wherein at least one of the monitoring nodes is associated with at least one of: sensor data, an auxiliary equipment input signal, a control intermediary parameter, and a control logic value.

20. The system of claim 15, wherein at least one monitoring node is associated with a plurality of decision boundaries and said comparison is performed in connection with each of those boundaries.

21. The system of claim 15, wherein the threat alert signal transmission is performed using at least one of: (i) a cloud-based system, (ii) an edge-based system, (iii) a wireless system, (iv) a wired system, (v) a secured network, and (vi) a communication system.

22. A computerized method to protect an industrial asset, comprising:
receiving, at a threat detection model creation computer, a series of normal monitoring node values from a normal space data source storing, for each of a plurality of monitoring nodes, the series of normal monitoring node values over time that represent normal operation of the industrial asset;
receiving, at the threat detection model creation computer, a series of abnormal monitoring node values from an abnormal space data source storing, for each of the plurality of monitoring nodes, a series of abnormal monitoring node values over time that represent abnormal operation of the industrial asset;
processing at least some the received monitoring node values with a deep learning model to determine parameters of the deep learning model, wherein the deep learning model is an autoencoder and received monitoring node values are processed by an encoder of the autoencoder;
using the parameters of the a deep learning model and received monitoring node values to compute feature vectors of the monitoring node values; and automatically calculating and outputting at least one decision boundary for a threat detection model based on the computed feature vectors, the decision boundary separating a normal state from an abnormal state for that monitoring node, wherein the threat detection model creation computer is further to calculate a cost function, associated with a cross-entropy loss or mean squared error, minimized using a backpropagation algorithm with stochastic gradient descent.

23. The method of claim 22, wherein the autoencoder is associated with at least one of: (i) a de-noised autoencoder, and (ii) a feedforward artificial neural network.

24. A non-transient, computer-readable medium storing instructions to be executed by a processor to perform a method of protecting an industrial asset, the method comprising:
  receiving, at a threat detection model creation computer, a series of normal monitoring node values from a normal space data source storing, for each of a plurality of monitoring nodes, the series of normal monitoring node values over time that represent normal operation of the industrial asset;
  receiving, at the threat detection model creation computer, a series of abnormal monitoring node values from an abnormal space data source storing, for each of the plurality of monitoring nodes, a series of abnormal monitoring node values over time that represent abnormal operation of the industrial asset;
  processing at least some received monitoring node values with a deep learning model to determine parameters of the deep learning model, wherein the deep learning model is an autoencoder and received monitoring node values are processed by an encoder of the autoencoder;
  using the parameters of the deep learning model and received monitoring node values to compute feature vectors of the monitoring node values; and
  automatically calculating and outputting at least one decision boundary for a threat detection model based on the computed feature vectors, the decision boundary separating a normal state from an abnormal state for that monitoring node, wherein the threat detection model creation computer is further to calculate a cost function, associated with a cross-entropy loss or mean squared error, minimized using a backpropagation algorithm with stochastic gradient descent.

25. The medium of claim 24, wherein the autoencoder is associated with at least one of: (i) a de-noised autoencoder, and (ii) a feedforward artificial neural network.

\* \* \* \* \*